United States Patent [19]

Yanagisawa

[11] Patent Number: 5,636,023
[45] Date of Patent: Jun. 3, 1997

[54] APPARATUS FOR MEASURING SURFACE SHAPE

[75] Inventor: Munehisa Yanagisawa, Gunma-ken, Japan

[73] Assignee: Shin-Etsu Handotai Co., Tokyo, Japan

[21] Appl. No.: 498,407

[22] Filed: Jul. 5, 1995

[30] Foreign Application Priority Data

Jul. 6, 1994 [JP] Japan ................................. 6-177672

[51] Int. Cl.⁶ ............................................ G01B 11/30
[52] U.S. Cl. ................................. 356/371; 356/376
[58] Field of Search ............................. 356/371, 376, 356/237, 239, 445–446

[56] References Cited

U.S. PATENT DOCUMENTS

| | | |
|---|---|---|
| 3,484,150 | 12/1969 | Taoka et al. ........................ 356/371 |
| 3,782,827 | 1/1974 | Nisenson et al. . |
| 3,791,956 | 2/1974 | Jakeman . |
| 3,850,528 | 11/1974 | Corey . |
| 3,857,637 | 12/1974 | Obenreder ........................ 356/371 |
| 4,548,506 | 10/1985 | Elson . |
| 4,818,108 | 4/1989 | Eppinger ........................ 356/376 |

FOREIGN PATENT DOCUMENTS 0164181  11/1985  European Pat. Off. .

*Primary Examiner*—Hoa Q. Pham
*Attorney, Agent, or Firm*—Ronald R. Snider

[57] ABSTRACT

An apparatus of measuring a surface shape, which enables the surface shape of a sample to be accurately and quantitatively measured by a simple procedure, is provided. A sample 1 is placed on a sample stage 3, a light is projected by an optical system 8 on the sample 1, the sample stage 3 is tilted at intervals of a unit angle and on the basis of a prescribed surface by a motor 6, a reflected light from the sample 1 is received by a CCD 16, and an operational analysis circuit 21, in response to a command from a CPU 17 and based on the data of light reception obtained by the CCD 16 at intervals of a unit tilting angle, performs an operational analysis on the surface shape of the sample.

4 Claims, 7 Drawing Sheets

FIG. 3
(a)
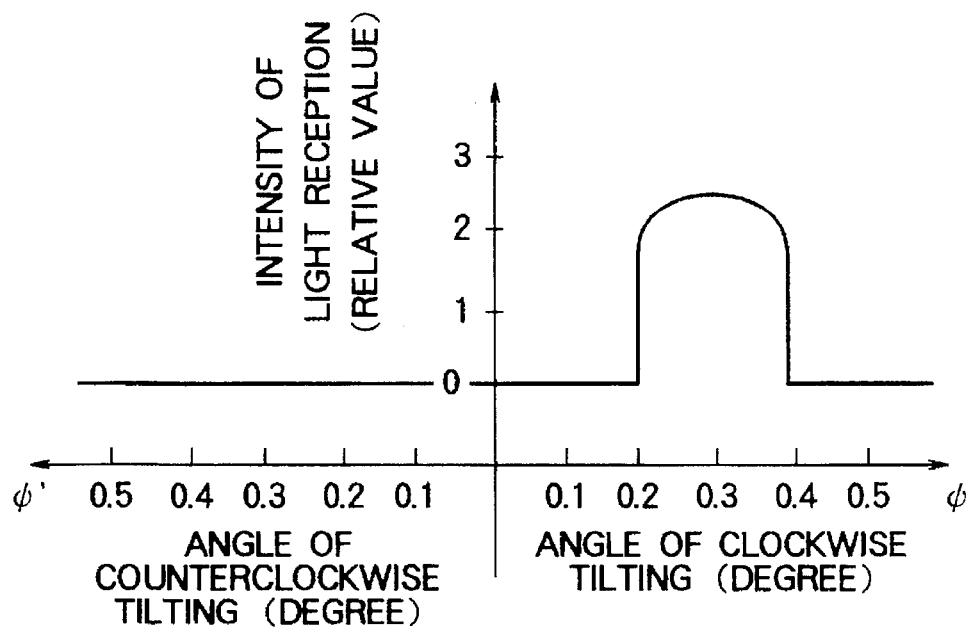
(b)
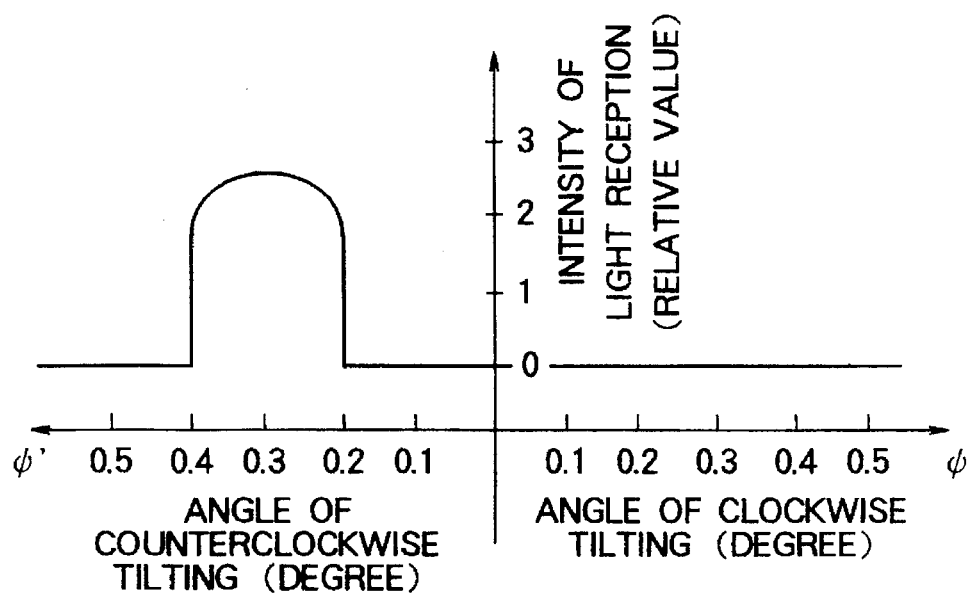

5,636,023

APPARATUS FOR MEASURING SURFACE SHAPE

BACKGROUND OF THE INVENTION

1. Field of the Invention

This invention relates to an apparatus of measuring the surface shape of a given sample.

2. Description of the Prior Art

For a compound semiconductor wafer which comprising a liquid phase epitaxial growth layer(s), for example, the surface state of the liquid phase epitaxial layer is itself one of the important product-specifications. Thus, the compound semiconductor wafer taken out from a production line is inspected for surface shape and acceptance or rejection is judged thereby.

A liquid phase epitaxial growth method is widely adopted for growing eptaxially a compound semiconductor layer(s) on a compound semiconductor substrate. In the compound semiconductor wafer comprising a liquid phase epitaxial growth layer(s), irregularities such as wrinkles, pits, and projections are liable to be formed in the surface portion of the liquid phase epitaxial growth layer.

In the fabrication of semiconductor devices such as light emitting diodes using the compound semiconductor wafer manufactured by the above-mentioned method, when the irregularities have large differences the in level, the electrodes formed in the regions containing such irregularities are rejective ones and consequently the semiconductor devices having such rejective electrodes are likewise rejective ones.

In the fabrication of various sorts of semiconductor devices from such compound semiconductor wafers comprising a liquid phase epitaxial growth layer(s), since the surface shapes of the liquid phase epitaxial growth layers influence the characteristics of the semiconductor devices as mentioned above, these surface shapes are needed to be examined to judge whether or not the surface shapes meet the standard of surface shape, namely the standard of surface irregularities, set in advance. And in the case of a wafer which is consequently found to contain a region(s) of a rejective surface shape, it is demanded that the position of this region is determined.

As method of measuring surface shapes, the moire fringe method which measures a surface shape by forming two regular distributions of light intensity on a given sample and overlapping these intensity distributions so as to form a moire fringe, the focussing method by vertically moving a given sample on which a beam of light is projected and measuring the shape in which the projecting beams of light are focussed, and the light interference method by using the phenomenon of light interference have been utilized.

The apparatuses to be used for these methods, however, call for complicate optical adjustments and necessitate time-consuming operations in order to measure surface shapes precisely and quantitatively. Further, the methods themselves impose conditions of their own on the measurable state of irregularities (degree of irregularities) of the surface of a given sample. Thus the conventional methods have been independently unable to implement measurement of the surface shapes of samples which have widely varied surface irregularities.

Also the method measuring a surface shape by projecting a collimated beam of light on a horizontally set sample, detecting the whole reflected light with a CCD, forming an image of the reflected light, displaying this image of the reflected light on a monitor, and visually examining the surface shape of the sample based on the image on the monitor has been adopted as well.

This method of measuring the surface shape of a sample by visually examining the image on the monitor allows a fully skilled operator to make a rough (qualitative) determination of the surface shape of the sample. It is, however, so deficient in accuracy as to measure quantitatively the surface shape of the sample.

SUMMARY OF THE INVENTION

This invention has been made in light of the abovementioned defects of the conventional methods pertinent to the measurement of surface shape. It is an object thereof to provide an apparatus of measuring the surface shape of a given sample which enable the surface shape of the sample to be measured accurately and quantitatively by a simple procedure.

To accomplish the object mentioned above, the first aspect of this invention resides in an apparatus of measuring a surface shape, wherein the appratus is characterized by comprising a sample stage for placing a sample thereon, light projecting means for projecting a light on the sample, light receiving means for receiving a reflected light from the sample, tilting means for tilting the sample wherein the tilt of the sample is performed by tilting the sample stage on the basis of a prescribed plane, or by moving said light projecting means and said light receiving means, or by combining said tilt by tilting the sample stage on the basis of the prescribed plane with said tilt by moving the light projecting means and the light receiving means, and detecting means for detecting surface irregularities of the sample based on the data of light reception of the light receiving means which are obtained at intervals of a unit angle by tiling with the tilting means.

To accomplish the object mentioned above, the second aspect of this invention resides in an apparatus of measuring a surface shape, wherein the apparatus is characterized by comprising a sample stage for placing a sample thereon, light projecting means for projecting a light on the sample, light receiving means for receiving a reflected light from the sample, tilting means for tilting the sample wherein the tilt of the sample is performed by tilting the sample stage on the basis of a prescribed plane, or by moving said light projecting means and said light receiving means, or by combining said tilt by tilting the sample on the basis of the prescribed plane with said tilt by moving the light projecting means and the light receiving means, and detecting means for detecting surface irregularities of the sample having an inclining angle exceeding a prescribed angle by tilting the sample by a prescribed angle clockwise and counterclockwise via said tilting means and superposing each of light reception data of said light receiving means obtained thereby.

To accomplish the object mentioned above, the third aspect of this invention resides in the apparatus, wherein the sample mentioned above is a compound semiconductor wafer comprising a liquid phase epitaxial layer.

To accomplish the object mentioned above, the fourth aspect of this invention resides in the apparatus, wherein said light receiving means is a CCD.

BRIEF DESCRIPTION OF THE DRAWINGS

These objects, features, and characteristics of this invention will become more apparent from the following detailed description of this invention when taken in conjunction with accompanying drawings wherein:

FIGS. 3(a) to 3(b) are a view presenting relation between tilting angle of a sample and intensity of light reception by CCD 16 in Example 1.

DETAILED DESCRIPTION OF THE EMBODIMENTS

According to this invention, the surface shape of a sample can be measured accurately and quantitatively by a simple procedure and acceptance or rejection can be judged thereby (by a standard whereby a sample which has surface irregularities exceeding a prescribed magnitude in the inclining angle is judged as rejective one). Also, in the case of a sample which contains regions of rejective surface shapes (regions having surface irregularities exceeding the prescribed magnitude in the incling angle), a map which discriminates among the regions of acceptable surface shapes and the regions of rejective surface shapes can be obtained quickly and precisely. Accordingly, since the invention enables the samples only with accepts/Die surface shapes (in the case of a sample containing regions of rejective surface shapes, the regions is, for example, removed as by severance) to be forwarded to the subsequent step, thus precluding the occurrence of rejections due to surface shape at the subsequent steps.

This invention will be described more particularly below with reference to working examples.

EXAMPLE 1

Example 1 according to this invention will be described below with reference to FIGS. 1 to 4.

Figure 1:
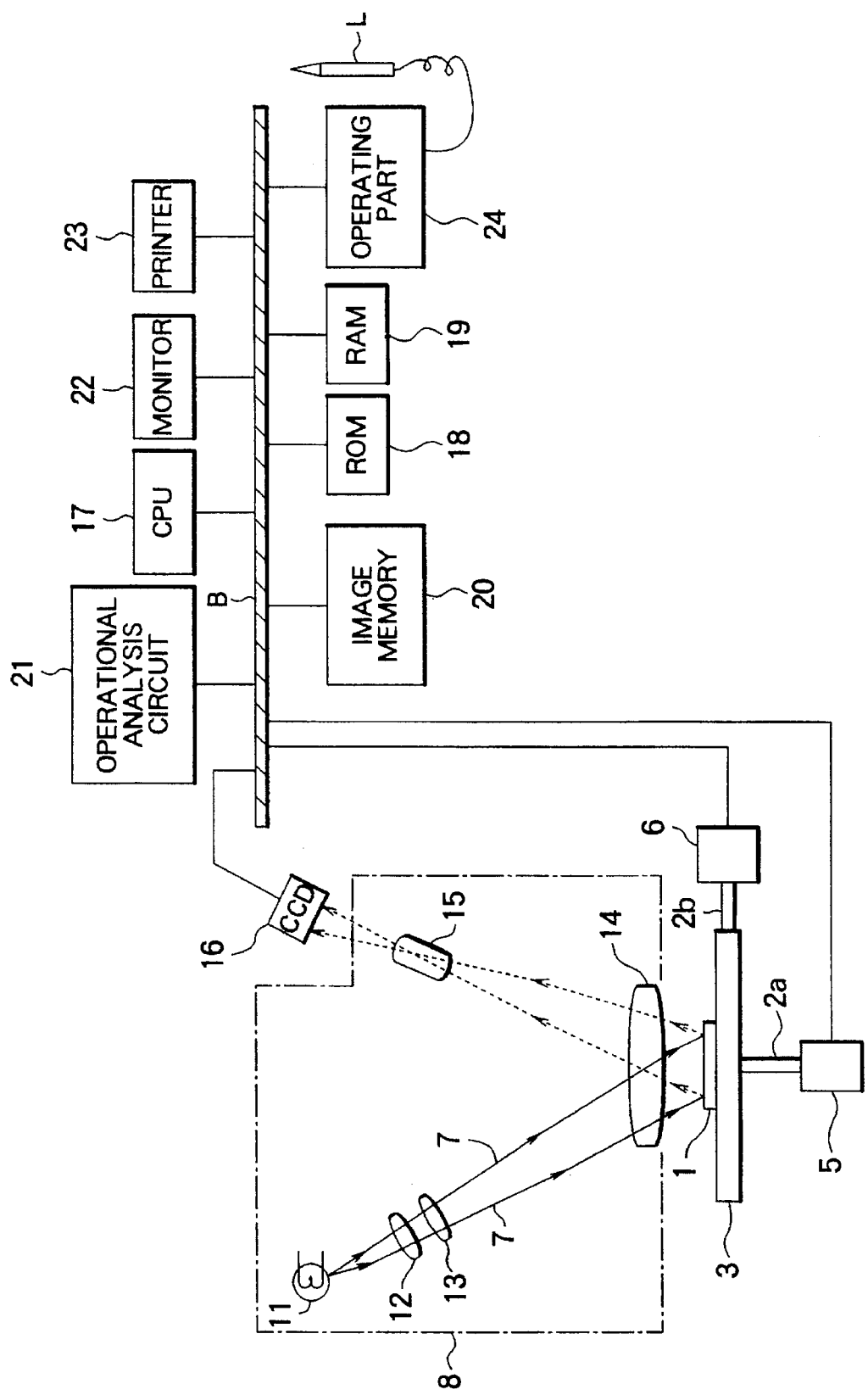
FIG. 1 is an explanatory view showing the construction of Example 1 according to this invention.

FIG. 1 is an explanatory view showing a construction of this example.

In this example, a sample stage 3 for placing a sample 1 such as a compound semiconductor wafer comprising a liquid phase epitaxial layer is disposed as shown in FIG. 1. This sample stage 3 is adapted to be rotated at intervals of a unit angle by motors 5 and 6 respectively round a vertical axis 2a perpendicular and a tilting axis 2b parallel to the horizontal surface thereof. Owing to this arrangement, the rotation of the sample stage 3 (sample 1) at intervals of a unit angle and the tilt thereof on the basis of a standard plane (for example, the surface of the sample stage for placing the sample thereon) at intervals of a unit angle are obtained. Above the sample 1 placed on the sample stage 3, an optical system 8 for projecting a collimated light 7 on the whole surface of the sample is disposed. This optical system 8 comprises a light source 11, illuminating lenses 12 and 13 for receiving a light from the light source 11 and for projecting the collimated light to the whole surface of the sample 1, a projecting objective lens 14, and a focussing lens 15 for focussing the reflected light from the sample 1. Behind this focussing lens 15, a CCD 16 for receiving the light reflected from the sample 1 and condensed by the focussing lens 15 is disposed.

The apparatus of this example is provided with a central processing unit (hereinafter referred to as "CPU") 17 for controlling the whole operation of the apparatus. This CPU 17 is connected to said CCD 16 via a bus B. Similarly, to the CPU 17, a ROM 18 for storing a control program, a RAM 19 for storing and feeding out various forms of data during the operation of control, and an image memory 20 for storing image data are connected via the bus B.

An operational analysis circuit 21 for carrying out operational analysis of the surface shape of the sample 1 based on the light reception data of CCD 16 obtained by rotating the sample stage 3 at intervals of a unit angle round the tilting axis 2b (optionally the vertical axis 2a is rotated to turn the sample stage 3) is similarly connected to the CPU 17 via the bus B. And, an operating part 24 equipping a light pen L which has a function for inputting control commands, a monitor 22 for displaying the surface shape of the sample which has undergone the operational analysis performed by the operational analysis circuit 21, a printer 23 for printing the data of surface shape, and the motors 5 and 6 are connected to the CPU 17 via the bus B.

The sample 1 is set in place on the sample stage 3, the power source is turned on, the operating part 24 is manipulated to perform preset adjustment, and the collimated light 7 is projected on the whole surface of the sample 1. As a consequence, the reflected light from the sample 1 is inputted continuously in the form of a light signal relative to the intensity of the reflected light into the CCD 16, the light signal is converted into an electric signal and then this electric signal is outputted as a shape signal. In response to a command from the CPU 17, the shape signal from the CCD 16 is introduced into the image memory 20. In the image memory 20, the shape data are stored in correspondence to position data.

When a command for mapping and conditions therefor are inputted through the operating part 24, the operational analysis circuit 21 reads the shape data and the corresponding position data from the image memory 20. The processing for mapping is carried out based on the data read out as mentioned shove and the figure of mapping is displayed on the monitor 22.

Next, the operation for measuring quantitatively the surface shape of the sample 1 by using the apparatus of measuring the surface shape shown in FIG. 1 will be mentioned below with reference to FIG. 1 and FIG. 2.

The surface irregularities of the sample are practically composed of inclining faces. In this invention, therefore, the degree of surface irregularities are quantified with the inclining angles of said inclining faces (hereinafter referred to as "inclining angles of faces" which are denoted with a symbol of θ; +θ° stands for an inclination directed upward to the right, −θ° for an inclination directed upward to the left and θ°>0). Here, the angles of the inclining faces constituting the surface irregularities mentioned above, i.e. the inclining angles of faces θ, are the angles of the inclining faces on the basis of a base plane of the sample (for example, the rear surface of the sample or a plane parallel thereto), as found in the sample 1 of FIG. 2.

In the apparatus shown in FIG. 1, the sample placing surface of the sample stage 3 set in the standard state (for example, in a horizontal state) or the plane parallel thereto is regarded as the standard plane S for measuring the surface shape. It is assumed that this standard plane S is unchanged even when the sample stage 3 is tilted. The collimated light 7 projected from the light source 11 on the surface of the sample 1 is reflected on the surface in question. This reflected light is received relative to the intensity thereof by the CCD 16. The image processing takes place, as mentioned above, based on the data of light reception, wherein said reflected light is received by the CCD 16 only when the angle of the faces on the basis of said standard plane S (the angle is denoted with a symbol of $\phi$; $+\phi°$ stands for an inclination directed upward to the right, $-\phi°$ for an inclination directed upward to the left and $\phi°>0$) is a prescribed angle $\phi_0$ or less (the prescrived angle $\phi_0$ can be set at an arbitrary angle by the adjustment of the optical system 8 and the CCD 16; hereinafter referred to as the "limited angle of light reception $\phi_0$"), and the intensity of the reflected light, namely the intensity of the light received by the CCD 16 is maximized when the angle $\phi$ is 0°.

The description given above will be specifically described below with reference to FIG. 2 (a). The sample stage 3 is set in the standard state (in the horizontal state) and the standard plane S (indicated by an alternate dash and dot line) is the sample poacing surface of the sample stage 3. For the sake of explanation herein, the sample 1 is assumed to have a simple structure possessing a surface (face) inclined by an angle $\theta$ on the basis of the rear surface of the sample 1 or a plane parallel thereto as the base plane. In the case of FIG. 2 (a), since the standard plane S is identical with the base plane of the sample 1, the inclining angle of the surface (face) $\theta$ on the basis of the base plane is equal to the angle of the surface $\phi$ on the basis of the standard plane S, thus $\phi=\theta$.

Accordingly, on the setting that the limited angle of light reception $\phi_0$ by the CCD 16 is ±0.1°, therefore, the inclining angle of the surface $\theta$ is detected as $|\theta|\leq0.1°$ ($-0.1°\leq\theta\leq+0.1°$) in case the reflected light from the surface of the sample 1 is received by the CCD 16, and in case the reflected light from the surface is not received by the CCD 16, the inclining angle of the surface $\theta$ is detected as $|\theta|>0.1°$ ($\theta<-0.1°$ or $\theta>+0.1°$). The sign, | |, shown above denotes an absolute value, which will apply invariably hereinafter.

With this detecting operation performed exclusively in holding the sample stage 3 or the sample 1 in the standard state, however, the inclining angle of the surface $\theta$ cannot be quantitatively detected because said inclining angle $\theta$ is detected only as "$|\theta|\leq0.1°$ or $|\theta|>0.1°$."

Now, the operation for detecting quantitatively the inclining angle of the surface $\theta$ of the sample by using the apparatus shown in FIG. 1 will be described below, taking into account the preconditions explained above.

(Detection Operation of Inclining Angle $\theta$)

The operation for quantitatively detecting the inclining angle of the inclining surface (face) $\theta$ is characterized by tilting the sample 1 on the basis of the standard plane S via the sample stage 3 in the apparatus shown in FIG. 1. This operation will be described below with reference to FIG. 2 (b), FIG. 2 (c), and FIG. 3, wherein the standard plane S (indicated by an alternate dash and dot line) and the base plane of the sample 1 are the same as those of FIG. 2 (a), and the limited angle of light reception $\phi_0$ by the CCD 16 is ±0.1°.

Figure 2:
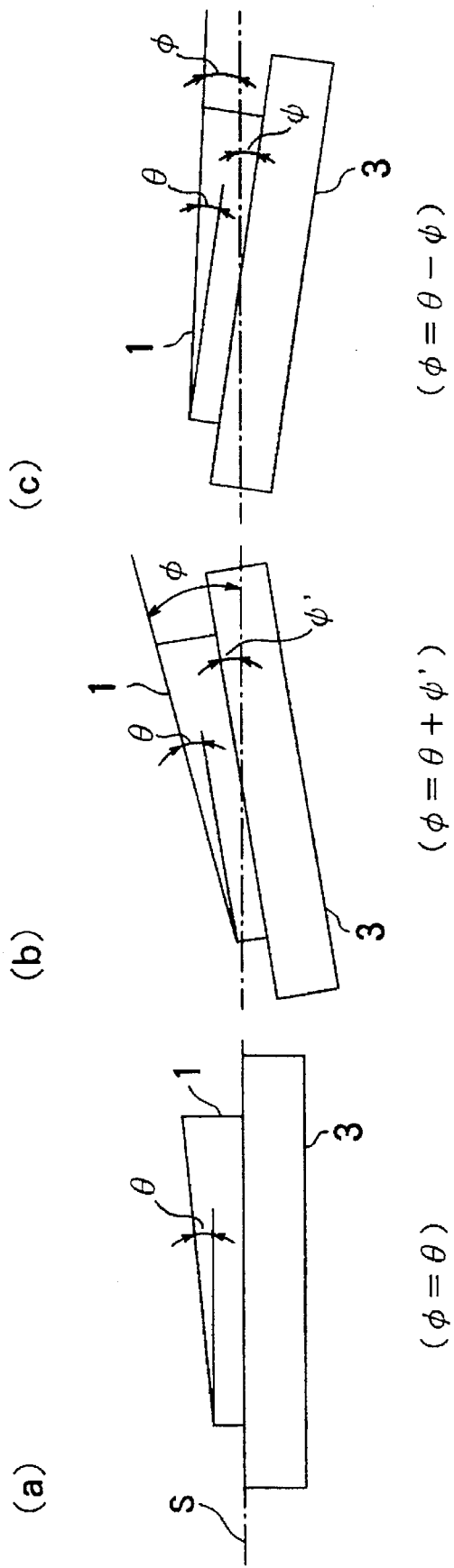
FIGS. 2(a) to 2(c) are a view showing the principle for detecting an inclining angle of surface in Example 1.

FIG. 2 (b) represents a case of tilting the sample 1 at intervals of a unit angle (the tilting angle: $\phi'$, $\phi'\geq0$) on the basis of the standard plane S counterclockwise via the sample stage 3. In this case, the inclining angle of the surface $\phi$ on the basis of the standard plane S is expressed by the formula (1) shown below.

$$\phi=\theta+\phi' \tag{1}$$

FIG. 2 (c) represents a case of tilting the sample 1 at intervals of unit angle (the tilting angle: $\phi$, $\phi\geq0$) on the basis of the standard plane S clockwise via the sample stage 3. In this case, the inclining angle of the surface $\phi$ on the basis of the standard plane S is expressed by the formula (2) shown below.

$$\phi=\theta-\phi \tag{2}$$

The intensity of the reflected light (intensity of light reception) P received by the CCD 16 is such that P=0 is obtained when $|\phi|>0.1°$ ($\phi<-0.1°$ or $\phi>+0.1°$) and P>0 is obtained when $|\phi|\leq0.1°$ ($-0.1°\leq\phi\leq+0.1°$). In the range of $-0.1°\leq\phi\leq+0.1°$, P shows the maximum value ($P_{max}$) when $\phi=0°$. By obtaining $\phi$ or $\phi'$ which shows $P_{max}$ (wherein $\phi=0°$), therefore, the inclining angle of the surface $\theta$ can be detected as $\theta=-\phi'$ or $\theta=+\phi$ based on the formula (1) or the formula (2).

This situation will be specifically described below with reference to FIG. 3. FIG. 3 shows the relation between the tilting angle of the sample 1 ($\phi$ and $\phi'$) and the intensity of light reception P by the CCD 16. In FIG. 3 (a), the intensity of light reception shows the maximum value (at this time, $\phi=0°$) when $\phi=0.3°$. From this state ($\phi=0°$ when $\phi=0.3°$) and the formula (2), the following formula (3) is derived.

$$\theta=\phi=+0.3° \tag{3}$$

Thus, the inclining angle of the surface $\theta$ can be detected as a gradient 0.3° directed upward to the right on the basis of the base plane of the sample 1.

In FIG. 3 (b), the following formula (4) is derived from the formula (1) in the same manner as described above.

$$\theta=-\phi'=-0.3° \tag{4}$$

Thus, the inclining angle of the surface $\theta$ can be detected to be a gradient 0.3° directed upward to the left on the basis of the base plane of the sample 1.

The operation for detecting the inclining angle $\theta$ in the present example described above permits the inclining angles $\theta$ of the faces constituting the surface irregularities of the sample 1 to be detected quantitatively with high accuracy. Thus, the surface shape of the sample 1 can be measured quantitatively with high accuracy.

Figure 4:
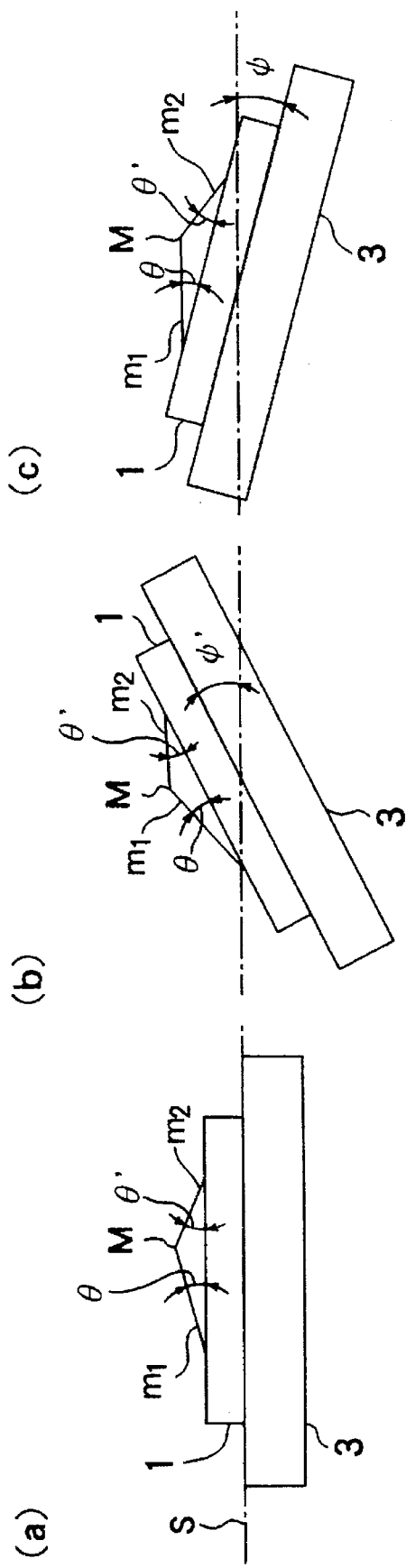
FIGS. 4(a) to 4(c) are an explanatory view showing the operation for detecting the angles of inclining faces in Example 1.

In accordance with this measuring operation, the surface shape of a sample 1 shown in FIG. 4 was measured (providing $\phi_0=\pm0.1°$). In the detecting operation of the standard state shown in FIG. 4 (a), the reflected light from the region M of the surface was not received at all by the CCD 16. The inclining angles $\theta$ of inclining faces constituting this region M was detected as $|\theta|>0.1°$ (namely $\theta<-0.1°$ or $\theta>+0.1°$). This qualitative shape data were stored in correspondence to the position data in the image memory 20.

Then, the sample 1 was tilted counterclockwise via the sample stage 3 as shown in FIG. 4 (b). In the region M read out of the image memory 20, the intensity of light, which was reflected from a inclining face $m_2$ and then received by the CCD 16, showed the maximum value when the tilting angle of the sample 1 $\phi'$ was 0.6°. As a result, the inclining angle $\theta'$ of the face $m_2$ was detected as a gradient 0.6° directed upward to the left (namely, $\theta'=-0.6°$).

Next, the sample 1 was tilted clockwise as shown in FIG. 4 (c). The intensity of light, which was reflected from an inclining face $m_1$ and then received by the CCD 16, showed the maximum value when the tilting angle $\phi$ was 0.3°. As a result, the inclining angle $\theta$ of the face $m_1$ was detected as a gradient 0.3° directed upward to the right (namely, $\theta=+0.3°$).

From such results, the region M of the surface of the sample 1 was determined to be a projection composed of the inclining face $m_1$ of +0.3° and the inclining face $m_2$ of −0.6°. This determination of shape showed fine agreement with values ($\theta=+0.25°$ and $\theta'=-0.63°$) determined by using a surface coarseness tester (produced by Kosaka Laboratory Ltd. and marketed under product code of "Model TR 100X").

EXAMPLE 2

A compound semiconductor wafer comprising a GaP liquid phase epitaxial growth layer was used as a sample 1. By the same measuring operation as that in Example 1, the surface shape of the GaP liquid phase epitaxial growth layer was measured.

The data of light reception of the sample 1 in the standard state and the data of light reception obtained by tilting the sample 1 clockwise and counterclockwise at intervals of a unit angle up to 0.6° were stored in the image memory 20.

Figure 5:
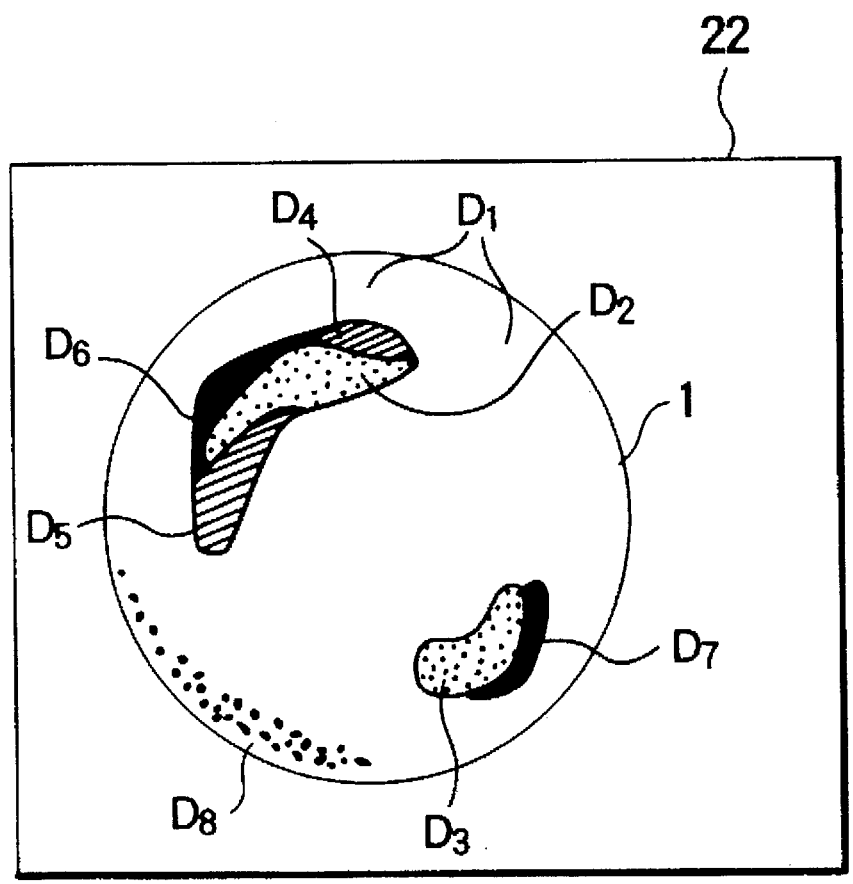
FIG. 5 is an explanatory view showing an example of a display on a monitor in Example 2 according to this invention.

When a command to display a map was injected through the operating part 24, the operational analysis circuit 21 performed an operational analysis based on the data of light reception stored in correspondence to the position data to detect the inclining angle $\theta$ of the inclining region in the whole surface of the sample 1. Then, in accordance with the range of $\theta$, the surface shape of the sample 1 was displayed on the monitor 22 as shown in FIG. 5. The image of map displayed on the monitor 22 may be printed on paper by the printer 23 manipulating the operating part 24.

In the map of surface shape of the sample 1 displayed on the monitor 22 as shown in FIG. 5, $D_1$ stands for a region having inclining faces where $|\theta|\leq 0.3°$, $D_2$ and $D_3$ stand for regions having inclining faces where $0.3°<|\theta|\leq 0.4°$, $D_4$ and $D_5$ stand for regions having inclining faces where $0.4°<|\theta|\leq 0.5°$, and $D_6$, $D_7$, and $D_8$ stand for regions having inclining faces where $|\theta|>>0.5°$.

According to the present example, the inclining angle $\theta$ of each of the inclining faces throughout the entire surface of the sample can be detected with high accuracy in correspondence to the position data. As a result, the surface shape of the sample can be measured and displayed. And also, light reception data, which are obtained in the standard state and in varying states of tilt by repeating the procedure of this example while rotating the sample 1 (by 90° clockwise, for example) by rotating the vertical axis $2a$, are stored together with the light reception data of this example in the image memory 20, and then by subjecting these light reception data to operational analysis, the measurement of the surface shape can be attained with further improved accuracy.

EXAMPLE 3

Figure 6:
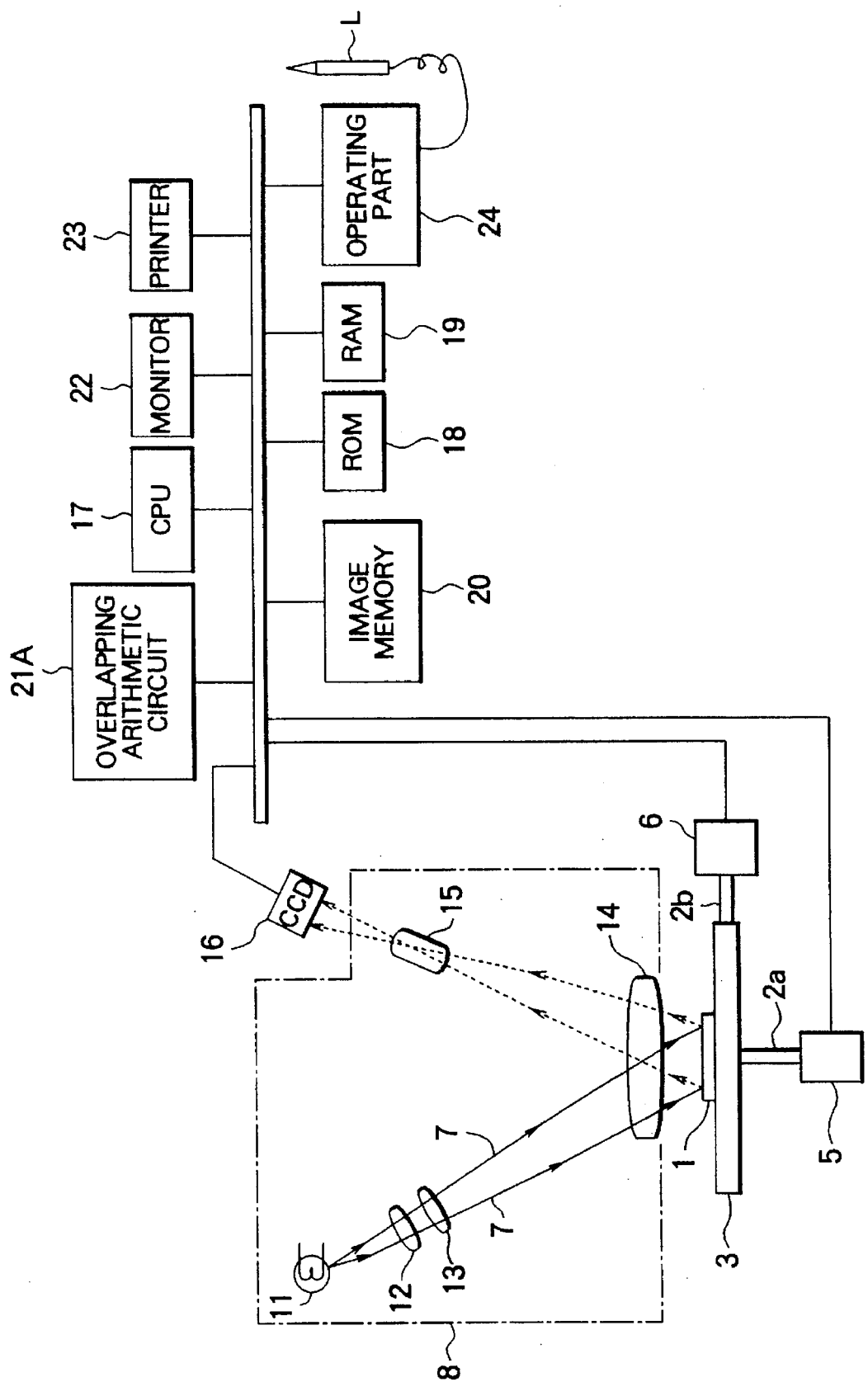
FIG. 6 is an explanatory view showing the construction of Example 3 according to this invention.
Figure 7:
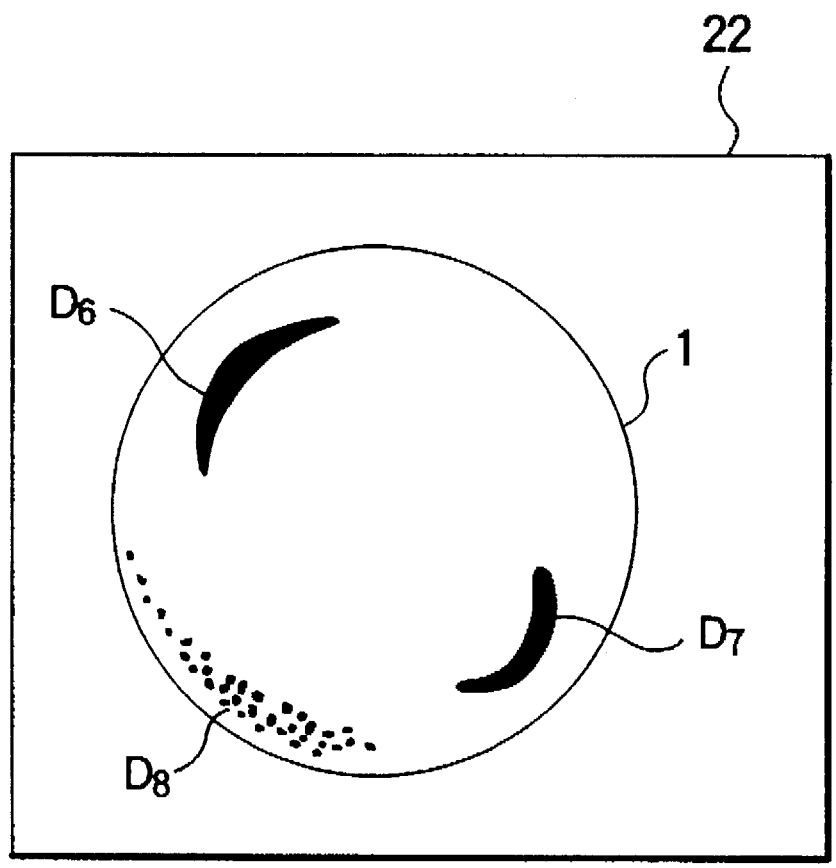
FIG. 7 is an explanatory view showing an example of a display on a monitor in Example 3.

This example will be mentioned with reference to FIG. 6 and FIG. 7. FIG. 6 is an explanatory view showing the construction of this example and FIG. 7 is an example of the image displayed on a monitor in this example.

This example is a simplified version of Example 2 mentioned above and is aimed at enabling surface shapes of products, at the site of manufacture, to be simply and accurately performed the judgement between acceptance and rejection. The apparatus of this example for measuring surface shapes is identical in construction with that of Example 1, except being provided with an overlapping arithmetic circuit 21A as an arithmetic circuit. In the state wherein the sample 1 is tilted at one same angle (determined by a standard of acceptance or rejection of inclining angle of faces $\theta$) clockwise and counterclockwise on the basis of the standard plane via the sample stage 3, this overlapping arithmetic circuit 21A has functions of receiving shape data, subjecting the shape data to cumulative arithmetic operation, and storing the cumulative data in the image memory 20 in correspondence to position data.

In this example, the same compound semiconductor wafer as used in Example 2 was adopted, and the regions having only inclining faces where $|\theta|\leq 0.5°$ were treated as acceptable ones and the regions having only inclining faces where $|\theta|>0.5°$ as rejective ones. The limited angle $\phi_0$ of light reception by the CCD 16A was one half of the boundary value, ±0.5°, between the standards of acceptance and rejection, namely ±0.25°. This value is based on the formula (1) and the formula (2) indicated in Example 1. Specifically, when the sample 1 is tilted by 0.25° counterclockwise, the angle $\theta$ of the face on the basis of the standard plane is derived from the formula (1) and represented by the formula (5) shown below.

$$\phi=\theta+0.25° \qquad (5)$$

Since the expression, $-0.25°\leq\phi\leq+0.25°$, is satisfied in the range of $-0.5°\leq\theta\leq 0°$, the reflected light from the inclining face is received by the CCD 16A. When the sample 1 is tilted clockwise by 0.25°, the angle $\phi$ based on the formula (2) is represented by the formula (6) shown below.

$$\phi=\theta-0.25° \qquad (6)$$

Since the expression, $-0.25°\leq\phi\leq+0.25°$, is satisfied in the range, $0°\leq\theta\leq+0.5°$, the reflected light from the inclining face is received by the CCD 16A.

When the collimated light 7 is projected from the optical system 8A on the sample 1 after the sample 1 has been tilted counterclockwise by 0.25°, the reflected light is detected by the CCD 16A and the shape data of the surface are stored in the image memory 20 as with the position data.

Then, the sample 1 is tilted clockwise by 0.25° and the procedure described above is repeated. Consequently, the shape data of the surface are stored in the image memory 20 with the position data.

The aforementioned shape data in this example are (1) those corresponding to $|\theta|\leq 0.5°$ when the reflected light is received by the CCD 16 (intensity of light reception P>0) or (2) those corresponding to $|\theta|>0.5°$ when the reflected light is not received by the CCD 16 (intensity of light reception P=0). When the shape data stored in the image memory 20 is displayed on the monitor 22, white picture elements (bright parts) appear in the case of (1) or black picture elements (dark parts) appear in the case of (2).

Then, by the overlapping arithmetic circuit 21A, the shape data of the sample 1 tilted counterclockwise by 0.25° and the shape data of the sample 1 tilted clockwise by 0.25° are superposed in correspondence to the position data and the resultant overlapped image data are stored as corresponded to the position data in the image memory 20. The overlapped data, when displayed on the monitor 22, appear as shown in FIG. 7.

The overlapped image of FIG. 7 is displayed with white picture elements (acceptable region) when both or either of the measuring operations by the counterclockwise tilt and by the clockwise tilt produce white picture elements, or with black picture elements (rejective regions) when both the operations produce black picture elements.

In this example, the regions of acceptable shape and the regions of rejective shape on the surface of the sample 1 can be displayed on the monitor 22, as mentioned above, in the form of a superposed image such as FIG. 7.

When the apparatus of this example of measuring surface shape is installed at a site of manufacture of GaP wafers comprising a liquid phase epitaxial growth layer and visual examination of surface shapes of the wafers is performed based on the standard of surface shape by observing overlapped images displayed on the monitor 22, judgement between acceptance and rejection, and the discrimination among regions of acceptable surface shape and regions of rejective surface shape can be attained.

Examples 1 to 3 cited above represent cases of adapting a sample stage to be tilted on the basis of a prescribed plane thereby allowing a sample to be directly tilted on the basis of a fixed standard plane and consequently enabling the sample to be tilted relative to stationary light projecting and light receiving means. Optionally, the tilt may be attained either by moving the light projecting means and the light receiving means or combining the tilt by tilting the sample stage on the basis of a prescribed plane with the tilt by moving the light projecting means and the light receiving means. In any event, the principle of measuring a surface shape is identical and the same effect is obtained.

The first aspect of this invention permits the surface shape of a sample to be quantitatively and automatically analyzed accurately and quickly because, when the sample stage is adapted to be tilted on the basis of a prescribed plane, for example, a light is projected on the sample placed on the sample stage, the sample stage is tilted at intervals of a unit angle on the basis of the prescribed plane (standard plane), the reflected light from the sample is received, and the surface shape of the sample is subjected to operational analysis based on the light reception data obtained at intervals of the unit tilting angle.

The second aspect of this invention permits the surface irregularities having inclining angles exceeding a prescribed angle to be accurately and quickly detected in correspondence to the position of the sample because, when the sample stage is adapted to be tilted on the basis of a prescribed plane, for example, a light is projected on the sample placed on the sample stage, the sample stage is tilted with symmetrical angles on the basis of the prescribed plane (standard plane), the reflected lights from the inclining sample are received, the data of light reception obtained with each of the tilts are superposed, and the overlapped data are available for the detection under discussion.

What is claimed is:

1. A method of measuring a surface shape comprising the steps of:

projecting a light on a sample mounted on a sample stage;

receiving reflected light from said sample; and measuring surface irregularities of said sample by superposing each of light reception data which are obtained in correspondence with locations of reflection while changing a tilting angle between said sample stage and a reference plane a plurality of times.

2. A method of measuring a surface shape comprising the steps of:

projecting a light on a sample mounted on a sample stage;

receiving a reflected light from said sample;

extracting surface irregularities of angles no smaller than a tilting angle of a surface irregularity by quantitatively measuring the surface irregularities of said sample by superposing each of light reception data which are obtained in correspondence with locations of reflection while changing a tilting angle between said sample stage and a reference plane a plurality of times.

3. The method of measuring a surface shape as claimed in claim 2, wherein said light reception data consist of:

the tilting angle between said sample stage and said reference plane and the intensity of each light received, and wherein a tilting angle of a surface irregularity is quantitatively determined at the tilting angle at which the intensity takes a maximum value.

4. The method of measuring a surface shape as claimed in claim 3, wherein the locations correlating to tilting angles at which the intensities take the maximum values are no smaller than a tilting angle between the projected light and said sample are displayed by superposition.

\* \* \* \* \*